Nov. 21, 1967   E. LOH ETAL   3,353,695
CHARGING DEVICE FOR MACHINES FOR WORKING OPTICAL LENSES
Filed Sept. 21, 1965   2 Sheets-Sheet 1
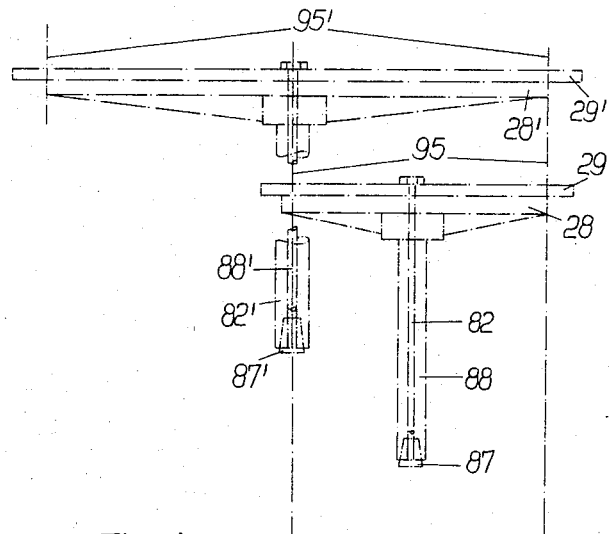
Fig.1
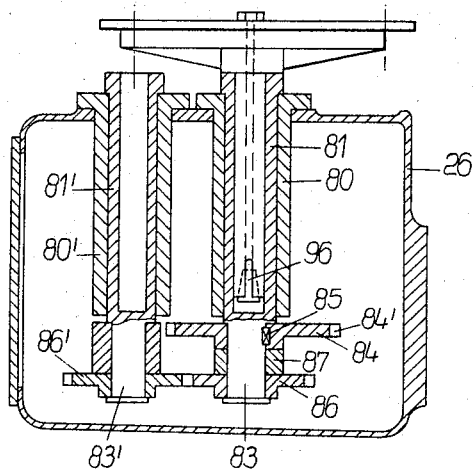
Inventors
Ernst Loh
Wilhelm Döll
By
Watson, Cole, Grindle & Watson
Attys.

Nov. 21, 1967  E. LOH ETAL  3,353,695
CHARGING DEVICE FOR MACHINES FOR WORKING OPTICAL LENSES
Filed Sept. 21, 1965  2 Sheets-Sheet 2
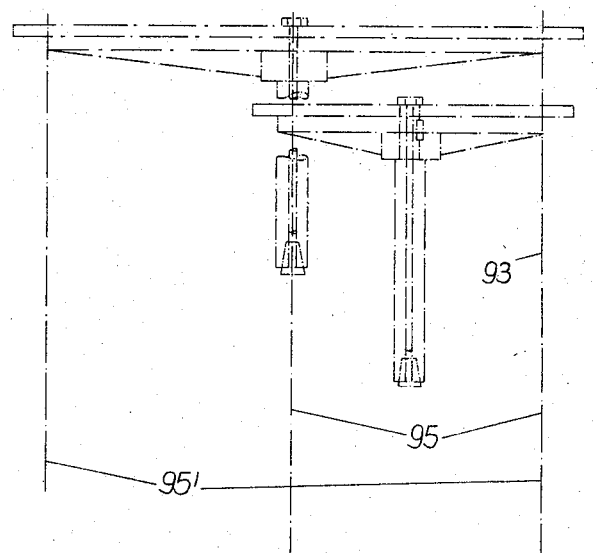
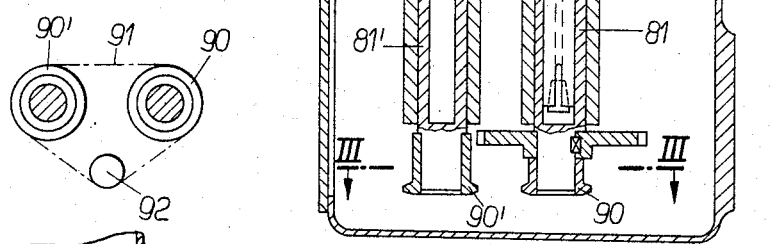
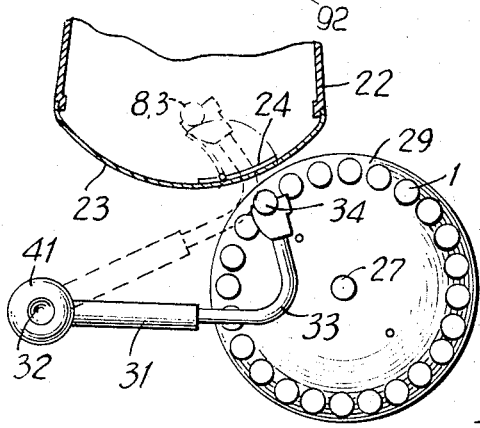
Inventors.
Ernst Loh
Wilhelm Dözz
By Watson, Cole, Grindle + Watson
Attys.

United States Patent Office 3,353,695
Patented Nov. 21, 1967

3,353,695
CHARGING DEVICE FOR MACHINES FOR WORKING OPTICAL LENSES
Ernst Loh, Wetzlar, and Wilhelm Döll, Burgsolms, Germany, assignors to Wilhelm Loh K.G. Optikmaschinenfabrik, Wetzlar, Germany, a corporation of Germany
Filed Sept. 21, 1965, Ser. No. 488,991
Claims priority, application Germany,
Sept. 23, 1964, L 48,851
9 Claims. (Cl. 214—89)

ABSTRACT OF THE DISCLOSURE

A charging appliance for machines for handling optical lenses, provided with a rotary disc which is interchangeable with other discs of different diameter in order to accommodate lenses of greater number or larger sizes and such larger or smaller magazine plates can be used as desired.

---

The invention relates to a charging appliance for machines for handling optical lenses. The charging appliance operates automatically and consists of a disk rotatable in steps, a magazine plate to be placed removably on the rotary disk, taking both the unfinished as well as the finished lenses, and a swivel arm with suction head, which may be swivelled by hand between the axis of the appliance taking up the lenses when handled and the axis of a receiving aperture of the magazine plate. Such a charging appliance is described in U.S. Patent No. 3,261,131 issued July 19, 1966.

A charging device of this kind should be applicable for as many lens sizes as possible. The seats for the lenses are arranged on a part circle on the magazine plates intended to receive the lenses. The capacity of a magazine plate should be as great as possible, so that a change of plate or refilling need be performed only at longer intervals.

The spaces between lens seats should be as narrow as possible. Only a few lenses of large size can be accommodated on a magazine plate of specific size. If too few lenses can be accommodated on the magazine plate however, this is disadvantageous particularly if it is employed in an automatic charging device, since the advantage of the automatic revolution of charging is largely lost if the magazines must be changed very frequently.

The further development according to the invention of the charging device referred to initially is characterised in that for entrainment of the plate or disc rotatable in steps, two parallel spindles are incorporated of which the axes are spaced apart by a distance such that the divided or pitch circles of magazine plates of different size carried by the spindles at least come close or intersect at the reception point intended for reception of the lenses.

A larger or smaller magazine plate can be used at will. A small plate is used during machining of small lenses, and a large plate for machining of large lenses. The number of the lenses accommodated on a magazine plate can then remain approximately identical, irrespective of whether large or small lenses are to be machined. Since the pitch circles intersect and touch at the point at which the lenses are picked up by the suction head, a displacement of the swivel arm is unnecessary when switching from a small magazine plate to a large one. The magazine plates may be so constructed that their angular divisions are identical despite different sizes. This means that even greater distance is provided between the individual seats on the larger magazine plate, the same angular division is retained as on a smaller magazine plate, on which the lens seats and which lie closer to each other. To switch from a smaller lens size to a larger lens size, it is thus merely necessary to employ the larger magazine plate mounted on the spindle coordinated with it. The setting of the stepping mechanism need not be changed, since the same division is retained, and since another lens is thus brought to the point at which it is grasped by the charging arm for each step of the stepping mechanism.

In an advantageous form of the invention, the two spindles are coupled to each other by a rotary drive system. If the distance between the spindles is fixed, each spindle is preferably connected in rotary manner to a gear, the gears of identical size meshing with each other. If the distance between the spindles is variable, a chain with a tensioning roller may serve as the rotary drive system as an example. A ratchet wheel or the like of a stepping mechanism may be arranged on one of the spindles in either case. Both spindles thus revolve during entrainment of the ratchet wheel, independently of whether they carry a disc for reception of a magazine plate or not and one of the spindles runs idle.

Further details of the invention are apparent from the following description of two examples of embodiments of the invention, in conjunction with the drawings and claims.

Referring to the drawings,

FIG. 1 is a section through a first example of the invention,

FIG. 2 is a section through a second example of the invention,

FIG. 3 is a cross section taken on line III—III of FIG. 2 in the direction of the arrows, and FIG. 4 is a plan view of the swivel arm and magazine plate.

Bearing sleeves 80 and 80' are secured on a housing 26 (FIG. 1) by means of flanges provided thereon. Hollow spindles 81 and 81' are rotatably mounted in the sleeves. Mandrels 82, 82' on which fastener discs 28, 28' are secured function as magazine plates 29, 29', to be inserted into the spindles.

Each spindle 81 and 81' has a collar at the top which rests on the sleeves 80, 80' and secures the spindles in the axial direction. The lower extremities 83, 83' of both spindles are solidly constructed and have a smaller diameter than the hollow stem. A ratchet wheel 84 or the like is fixed on the spindle 81 shown at the right of the FIG. 1, and is secured by means of a key 85. The lower extremity 83 of the spindle 81 carries a gear 86, which is spaced from the ratchet wheel 84 by means of a spacing sleeve 87. The spindle 81' provided at the left also carries a gear 86' meshing with the gear 86, but the spindle 81' does not carry a ratchet wheel.

Each mandrel 82, 82' is slotted in its lower region (slot 96) and may be spread open by a cone 87, 87' arranged to be drawn into the hollow space of the mandrel 82, 82' by means of a bolt 88, 88'. By being spread open in this manner, the mandrel may be adjusted in the hollow spindle 81 resp. 81' in a rotatory manner, i.e. at optional height.

In the modified form according to FIGS. 2 and 3, only one of the hollow spindles, namely 81, is mounted in the casing 26 in a non-displaceable manner, whereas the second spindle 81' may be displaced in the direction of the spindle 81. To this end, its bearing sleeve 80' is displaceable in a casing slot 89 and is immobilisable in any displaced position. In this example, the two spindles are also coupled to each other by a rotary drive system, which is a chain gear system, comprising the chain sprockets 90, 90' connected to the spindles to rotate therewith by means of, the chain 91 indicated by a dash-dotted line, and the tensioning roller 92. A rotary drive system of this kind allows a variation in the inter-axial spacing of the spindles 81, 81'. During an increase in spacing, the tensioning roller 92 is pressed upwards as seen in FIG. 3.

With reference to the structure of the swivel arm with a suction head for removing work from an aperture in the magazine plate, attention is directed to FIG. 3, which shows a swivel arm as a pivoted member 31 which is composed of two tubes and is pivotable about a pin 32 and which serves for removing the lenses 1 from the magazine plate 29. The pivoted arm 31 has a forward end tube 33 which is bent over at an acute angle and carries a suction head 34. The arm 31 is connected to a double arm lever 41 and, as shown, the magazine plate 29 is positioned on the shaft 27. The pivoted arm 31 will shift the lenses 1 from the plate 29 to the cap 23 as shown in dotted lines 8.3. The lenses are moved into housing part 22 into a transparent cap 23 and through the pivoted window 24.

The device operates as follows:

If lenses of smaller diameter are to be worked, the disc 28 is secured by insertion of the mandrel 82 into the spindle 81 and spreads open of the lower spindle extremity by tightening the cone 87' by means of the bolt 88 at an appropriate height. Only one magazine plate 29, suitable for the small lens size, can be placed on the disc 28. The step movement of the disc 28 takes place by means of a pawl which engages in the teeth 84' of the ratchet wheel 84. The point at which the swivel arm engages the lenses of the magazine plate 29 is indicated by the dash-dotted line 93, FIG. 2.

If lenses of substantially greater diameter are to be worked, that is to say lenses which cannot be accommodated in the seats of the magazine plate 29 fitting on the disc 28, a larger magazine 29' is employed. So that this larger magazine 29' may be secured, the large disc 28' is substituted for the small disc 28'. This disc is secured by insertion of its mandrel or shank 82' into the sleeve of the spindle 81'. The operation of this disc is equally operated by means of the ratchet wheel 84 which drives the spindle 81 and thus the gear 86 secured thereto to rotate therewith. This rotary motion is transmitted to the spindle 81' by the gear 86' meshing with the gear 86, thus driving the disc 28' and consequently the magazine plate 29'. The inter-axial distances of the spindles 81, 81' and the diameters of the pitch circles 95, 95' on which the lens seats are located in the magazine plates 29, 29', and are so matched to each other that the pitch circles 95, 95' of the two discs touch each other in the region of the line 93. Another lens seat reaches the dash-dotted line 93 during each step, with identical angular division of the lens seats on the magazine plate and without adjustment of the intermittent mechanism. If the angular spacing does not correspond, the step mechanism must be readjusted.

In the form of the invention of FIGS. 2 and 3, the axial distance between the spindles 81, 81' can be adjusted in stepless manner, so that one may employ magazine plates in more than two sizes, each having a different pitch circle diameter. The sleeve 80' is so adjusted in each case that the pitch circles of the magazine plates pass through the locus of the line 93.

The invention also covers forms of structure in which the pitch circles of the two discs do not touch each other. The success residing in that a seat reaches the reception point of the swivel arm for every switching step, may also be accomplished by causing the pitch circles to intersect at the point of reception. The advantages of the invention may also be secured by an arrangement in which the pitch circles neither intersect nor touch each other. An adjustment of the swivel arm would be necessary in this case, when changing discs.

We claim:

1. Charging device for machines for handling and working optical lenses, which operates automatically comprising a disc 5 rotatable by steps, a magazine plate receiving the blanks as well as the worked lenses and releasably secured on the rotary disc 5, and a swivel arm having a suction head, which is swivellable mechanically between the axis of the device receiving the lenses during their working and the axis of a reception aperture of the magazine plate, and manually between the latter and a position situated outside the magazine plate, for entrainment of the disc rotatable by steps, two parallel spindles are incorporated, whereof the axes are at such distance from each other that the pitch circles of magazine plates of different size and carried by the spindles come at least close or intersect at the reception point intended for reception of the lenses.

2. Device according to claim 1, characterised in that the spindles are at different distances from the reception point of the swivel arm, a large disc being employed for fitting on the spindle situated at a greater distance from the reception point and a small disc is provided for fitting on the spindle situated nearer to the reception point.

3. Device according to claim 1, characterised in that the distance between the spindles is adjustable in stepless manner.

4. Device according to claim 1, characterised in that the spindles are hollow and each disc is equipped with a central mandrel firmly affixed to its disc and arranged for insertion in the hollow spindles in co-rotatory manner.

5. Device according to claim 4, characterised in that the mandrel is radially expansible slot 9 and is held fast in the hollow spindles by radial wedging.

6. Device according to claim 1, characterised in that the one spindle is coupled to the other by a rotary drive system.

7. Device according to claim 1, characterised in that each spindle is connected in co-rotatory manner with a gear and that the two gears of identical size mesh with each other.

8. Device according to claim 1, characterised in that a rotary drive system is incorporated which allows of changes in the distance between the spindles, as a chain drive system having a tensioning roller.

9. Device according to claim 1, characterized in that a ratchet wheel is connected in co-rotatory manner with one of the spindles for rotary entrainment by steps of the two spindles.

References Cited

UNITED STATES PATENTS 2,486,128  10/1949  Davis _____ 198—209 XR
2,780,372  2/1957  Covitt et al. _____ 214—89

GERALD M. FORLENZA, *Primary Examiner.*

ALBERT J. MAKAY, *Examiner.*